(12) United States Patent
Cook et al.

(10) Patent No.: US 9,386,748 B2
(45) Date of Patent: Jul. 12, 2016

(54) TRANSPORT SYSTEM FOR A HEADER OF AN AGRICULTURAL HARVESTER

(71) Applicant: CNH Industrial America LLC, New Holland, PA (US)

(72) Inventors: Joel Timothy Cook, Lititz, PA (US); Andrew V. Lauwers, Stevens, PA (US); Blaine Noll, Fleetwood, PA (US)

(73) Assignee: CNH Industrial America LLC, New Holland, PA (US)

( * ) Notice: Subject to any disclaimer, the term of this patent is extended or adjusted under 35 U.S.C. 154(b) by 134 days.

(21) Appl. No.: 14/268,377

(22) Filed: May 2, 2014

(65) Prior Publication Data

US 2015/0313084 A1 Nov. 5, 2015

(51) Int. Cl.
*A01B 49/00* (2006.01)
*A01D 75/00* (2006.01)
*A01B 73/00* (2006.01)
*A01D 41/14* (2006.01)

(52) U.S. Cl.
CPC ............ *A01D 75/004* (2013.01); *A01B 73/005* (2013.01); *A01D 41/144* (2013.01)

(58) Field of Classification Search
CPC ...... A01B 63/16; A01B 73/00; A01B 73/005; A01B 51/04; A01B 63/22; A01B 73/065; A01D 75/002; A01D 89/004
USPC .................. 172/311, 310, 240; 280/9, 415.1; 56/228
See application file for complete search history.

(56) References Cited

U.S. PATENT DOCUMENTS

| | | | | |
|---|---|---|---|---|
| 2,779,261 A | * | 1/1957 | Northcote | A01B 21/08 172/240 |
| 2,833,105 A | * | 5/1958 | Naery | A01B 73/005 56/15.6 |
| 3,288,480 A | * | 11/1966 | Calkins | A01B 39/19 172/413 |
| 3,590,928 A | | 7/1971 | Mirus | |
| 3,721,461 A | * | 3/1973 | Nelsen | A01B 73/005 172/1 |
| 3,919,831 A | * | 11/1975 | Halls | A01D 75/002 56/228 |
| 4,442,662 A | * | 4/1984 | Jennings | A01B 73/005 172/625 |
| 4,450,918 A | | 5/1984 | Danford | |
| 4,506,904 A | * | 3/1985 | Kinzenbaw | A01B 73/005 172/248 |
| 4,552,375 A | * | 11/1985 | Kinzenbaw | A01B 73/005 172/248 |
| 4,625,809 A | * | 12/1986 | Moynihan | A01B 35/18 172/178 |

(Continued)

FOREIGN PATENT DOCUMENTS

DE 3709633 A1 10/1988
EP 2687074 A1 1/2014

*Primary Examiner* — Árpád Fábián-Kovács
(74) *Attorney, Agent, or Firm* — Patrick M. Sheldrake

(57) ABSTRACT

A folding wheel transport assembly is attachable to a header frame of an agricultural harvester and includes a wheel, a wheel axle support member carrying the wheel, a linkage connected to the wheel axle support member, and an actuator for moving the linkage and the wheel from a transportation position to a harvesting position. The wheel axle support member is pivotably connected to the linkage whereby the wheel pivots inwardly toward the header frame as the wheel moves between the transportation and harvesting positions.

7 Claims, 14 Drawing Sheets

(56) References Cited

U.S. PATENT DOCUMENTS

| | | | | |
|---|---|---|---|---|
| 4,682,462 A * | 7/1987 | Johnson, Sr. | ......... | A01B 73/005 172/383 |
| 4,765,639 A * | 8/1988 | Murray | ............... | A01B 73/005 172/625 |
| 4,821,811 A | 4/1989 | Swenson | | |
| 4,871,028 A * | 10/1989 | Murray | ............... | A01B 73/005 172/248 |
| 4,934,131 A * | 6/1990 | Frisk | ................... | A01B 73/005 56/15.5 |
| 4,986,064 A * | 1/1991 | Ermacora | ........... | A01B 73/005 280/415.1 |
| 5,000,268 A * | 3/1991 | Zimmerman | ....... | A01C 15/005 172/240 |
| 5,044,447 A * | 9/1991 | Langeoire | ........... | A01B 73/005 172/56 |
| 5,191,942 A * | 3/1993 | Bussiere | .............. | A01B 21/04 172/248 |
| 5,357,737 A * | 10/1994 | Ermacora | ........... | A01D 43/105 56/13.6 |
| 6,152,240 A * | 11/2000 | Nonhoff | .............. | A01D 89/004 172/311 |
| 6,209,297 B1 | 4/2001 | Yeomans et al. | | |
| 6,238,170 B1 * | 5/2001 | Pingry | ................... | A01B 51/04 172/311 |
| 6,260,629 B1 * | 7/2001 | Toth | ..................... | A01B 73/005 172/278 |
| 6,336,313 B1 | 1/2002 | Bonnewitz | | |
| 6,408,950 B1 * | 6/2002 | Shoup | .................. | A01B 73/065 111/57 |
| 6,532,723 B2 * | 3/2003 | Delmas | ............... | A01B 73/005 56/14.7 |
| 6,655,118 B1 * | 12/2003 | Thompson | .......... | A01D 43/107 56/15.8 |
| 6,758,284 B2 * | 7/2004 | Myers | .................... | A01B 73/00 172/311 |
| 7,162,854 B2 * | 1/2007 | Yeomans | ............. | A01B 73/005 56/1 |
| 7,197,865 B1 | 4/2007 | Enns et al. | | |
| 7,347,277 B2 * | 3/2008 | Enns | ................... | A01B 73/005 172/311 |
| 7,926,249 B1 | 4/2011 | Cook | | |
| 8,025,312 B1 | 9/2011 | Honas et al. | | |
| 8,112,977 B2 | 2/2012 | Priepke | | |
| 8,151,547 B2 | 4/2012 | Bich et al. | | |
| 8,235,133 B2 * | 8/2012 | Friggstad | ............. | A01B 73/065 16/35 R |
| 2012/0132768 A1 * | 5/2012 | Lammerant | .......... | A01D 89/004 248/221.11 |
| 2013/0186657 A1 * | 7/2013 | Kormann | ............. | A01B 69/005 172/1 |
| 2013/0284467 A1 * | 10/2013 | Snider | .................... | A01B 63/22 172/328 |
| 2013/0305677 A1 * | 11/2013 | Patterson | ............. | A01D 75/002 56/14.5 |

\* cited by examiner

TRANSPORT SYSTEM FOR A HEADER OF AN AGRICULTURAL HARVESTER

BACKGROUND

The subject application relates generally to a header for use with agricultural harvesters. In particular, the subject application relates to a wheel transport assembly for enabling the header to be converted from a harvesting configuration wherein the header may harvest crop to a transportation configuration wherein the header may be transported on roads from one location to another.

To increase harvesting efficiency, harvesters, such as combines, have increased in size and capacity. With this increase in capacity, the detachable header attached to the combine for picking a crop has increased in size as well. The increased size of the header has resulted in transportation difficulties in moving the header from field to field. In many instances, larger headers must be transported lengthwise down roads. As consequence, operators often use a separate trailer to transport the headers. As consequence, an operator is required to purchase and maintain a separate piece of trailer machinery, and the header must be returned to the trailer or the trailer brought to the header for transport. Other headers include wheels that can be attached for transportation and detached for operation. However, such wheels can be heavy and difficult to remove and reattach.

Other headers include integral wheels for harvesting and transportation. In some of these headers, the transport wheels swing beneath the header frame between harvesting and transport positions. In situations where there is sufficient ground clearance to permit free swinging of the wheels under the header frame, the wheels only touch the ground during header transport. An advantage of such systems is that the wheels do not touch the ground during harvesting. Consequently, the header cutterbar can cut very close to the ground during a harvesting operation. A disadvantage of such apparatus, however, is that on certain combines and tire combinations there is insufficient ground clearance to permit free swinging of the wheel under the header frame between the transport and harvesting positions. Under such circumstances, the wheel can contact the ground during deployment which can result in part failure such as damage to the wheel, its support structure and/or the actuator that moves the wheel between the transport and harvesting positions.

BRIEF SUMMARY

In accordance with a first aspect, the subject application provides a transport assembly for a header of an agricultural harvester including a header frame, an axle support member and a first swing arm having a first end pivotably connected to the header frame and a second end opposite the first end pivotably connected to the axle support member. The axle support member pivots relative to the first swing arm between a first position and a second position.

In accordance with a second aspect, the subject application provides a wheel assembly for a combine harvester including a wheel axle support member having a proximal end and a distal end connected to a wheel. The wheel assembly further includes a first linkage and a second linkage. The first linkage has a first end for pivotably connecting to a chassis and a second end opposite the first end pivotably connected to the wheel axle support member. The second linkage has a first end for pivotably connecting to a chassis and a second end opposite the first end pivotably connected to the wheel axle support member. The wheel axle support member pivots relative to the first and second linkages between a first position and a second position.

In accordance with a third aspect, the subject application provides a transport assembly for a header of an agricultural harvester including a header frame, an axle support member supporting a wheel axle and the wheel axle rotatably carrying a wheel. The assembly further includes a two point pivot linkage assembly linking the axle support member to the header frame. The two point pivot linkage assembly has first ends pivotably connected to the header frame and second ends opposite the first ends pivotably connected to the axle support member. The axle support member pivots about or relative to the two point pivot linkage assembly between a transportation position and a harvesting position.

In accordance with a fourth aspect, the subject application provides a method of moving a wheel of a header of a combine harvester between a transport position and a harvesting position. The method includes the act of linking the wheel to a frame of the header with a two point pivot linkage assembly, wherein the wheel is moveable relative to the frame between the transportation position and the harvesting position. When in the transportation position the wheel defines a circle with a radius defined by a fixed distance of the wheel from the frame as a result of the two point pivot linkage assembly. The method further includes the act of moving the wheel from the transportation position to the harvesting position in a chord-like fashion partially through the circle.

In accordance with a fifth aspect, the subject application provides a folding wheel conversion system for a header of a combine harvester wherein the transport wheel swings under the header frame through a vertical plane as it moves between transportation and harvesting positions. Existing wheel folding transport assemblies of this sort follow a true circular arc path whereas the system of the subject application follows a flatter arc as it swings beneath the header frame thereby resulting in increased ground clearance at the bottom of the arc.

The system of the subject application provides a wheel support frame with an additional structural joint to allow the wheel mount or wheel axle support member to fold with assistance from a control rod that is mounted to a main transport frame. Two additional angle members are also provided that become pinched between a wheel frame and the main transport frame when the combine and header are in transport mode whereby the control rod does not experience loading while the combine is traveling on a road or highway.

An extendable and retractable actuator moves the wheel from road (transportation) mode to field (harvesting) mode, and vice versa. As the wheel under the header cutterbar begins to move from transportation mode to harvesting mode, the control rod acts on the wheel mount and begins to fold it inwardly. As the wheel continues to move, the control rod continues to pull the wheel mount closer to the header frame as it passes under the header, thereby creating additional ground clearance versus existing designs. Once the wheel mount passes directly under the control rod mounting point, the control rod begins to push the wheel mount away from the header frame so that the wheel mount can clear the lower tube of the header frame. And, once fully in field (harvesting) mode, the wheel mount and wheel support frame are again perpendicular to each other and stowed under the header frame. While proceeding from field (harvesting) mode to road (transportation) mode, the system works in an opposite fashion.

Further, as the wheel mount reaches the end of the actuator stroke going from harvesting to transportation mode, the two angle members become pinched between the transport main frame and the cutterbar wheel mount. Consequently, side loading that the wheel mount may experience during transportation mode or connection to the combine is absorbed. Likewise, loading on the control rod during transportation mode is eliminated.

DETAILED DESCRIPTION

Reference will now be made in detail to the various aspects of the subject application illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, left, right, above, below and diagonal, are used with respect to the accompanying drawings. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

Figure 1:
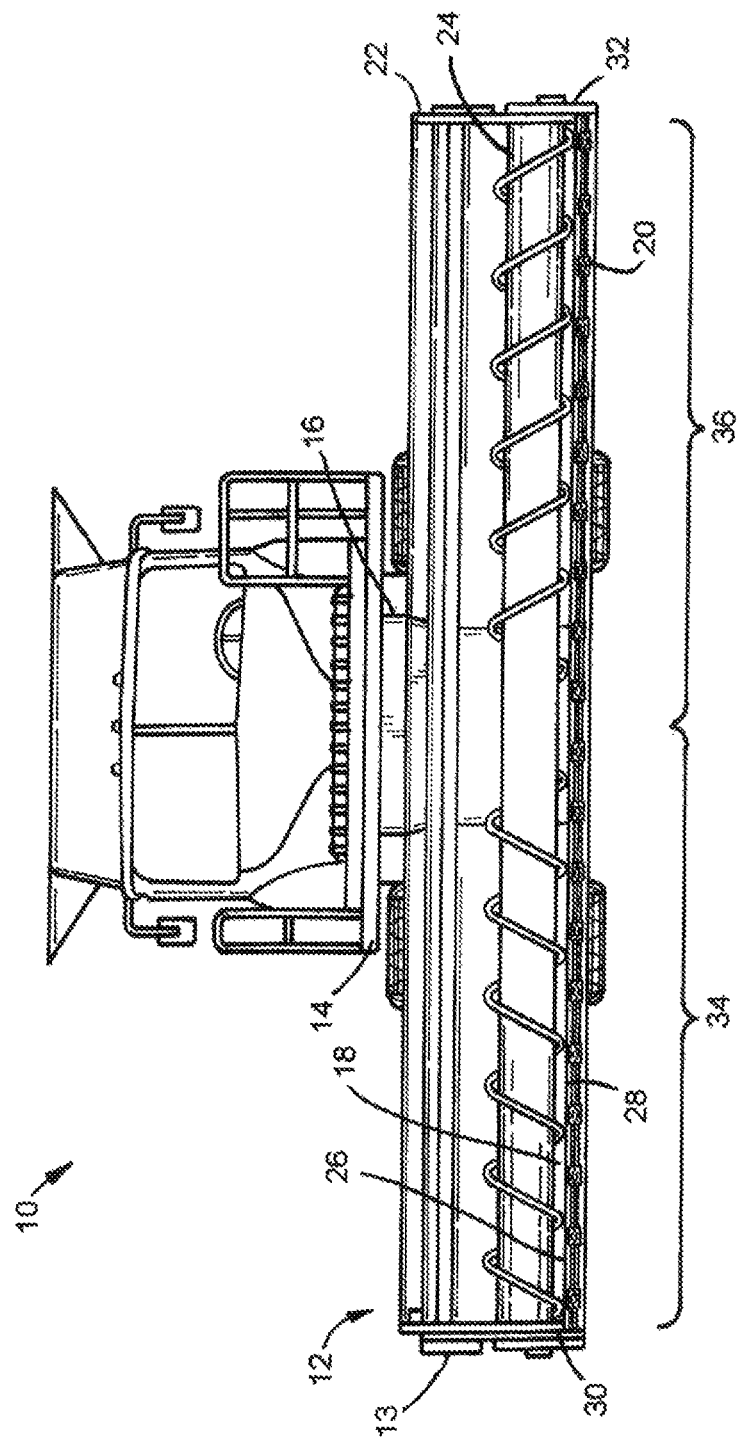
FIG. 1 is a front elevation view of a conventional agricultural harvester including a header.

Referring now to the drawings, wherein aspects of the subject application are shown, FIG. 1 illustrates an agricultural harvester 10 such as a combine. Harvester 10 includes a header 12 including a chassis or frame 13 which is attached to a forward end 14 of the harvester. Header 12 is configured to cut crops and to induct the cut crops into a feederhouse 16 as harvester 10 moves forward over a crop field.

Header 12 further includes a floor 18 that is supported in desired proximity to the surface of a crop field and an elongate sickle or cutterbar 20 that extends transversely along a forward edge of the floor 18. Cutterbar 20 is configured to cut crops in preparation for induction into the feederhouse 16. Additionally, header 12 includes an elongate, transversely extending harvesting reel 22 disposed above cutterbar 20. Harvesting reel 22 is rotatable in a direction suitable for facilitating the induction of cut crops into feederhouse 16. Header 12 further includes an elongate, rotatable auger 24 which extends in close proximity to a top surface 26 of floor 18. Auger 24 is configured to cooperate with harvesting reel 22 in conveying cut crops to feederhouse 16, which is configured to convey the cut crops into harvester 10 for threshing and cleaning. While FIG. 1 illustrates a header including an auger conveyor system, it will be understood that the header may alternatively be configured to include a draper conveyor system or any combination of auger, draper or other conveyor system that may be suitable for conveying cut crop material to feederhouse 16.

Cutterbar 20 extends along a forward edge 28 of floor 18, and generally is bounded by a first side edge 30 and an opposing second side edge 32 of floor 18. Cutterbar 20 can be configured to include a first reciprocating knife assembly 34 and a second reciprocating knife assembly 36 (along with an unillustrated stationary knife). The reciprocating mechanisms of such knife assemblies are known in the art and a further detailed description of their structure, function and operation is not necessary for a complete understanding of the subject application. However, a typical reciprocating mechanism applicable to the knife assembly of the subject application is disclosed in U.S. Pat. No. 8,151,547, the entire disclosure of which is incorporated by reference herein.

Figure 2:
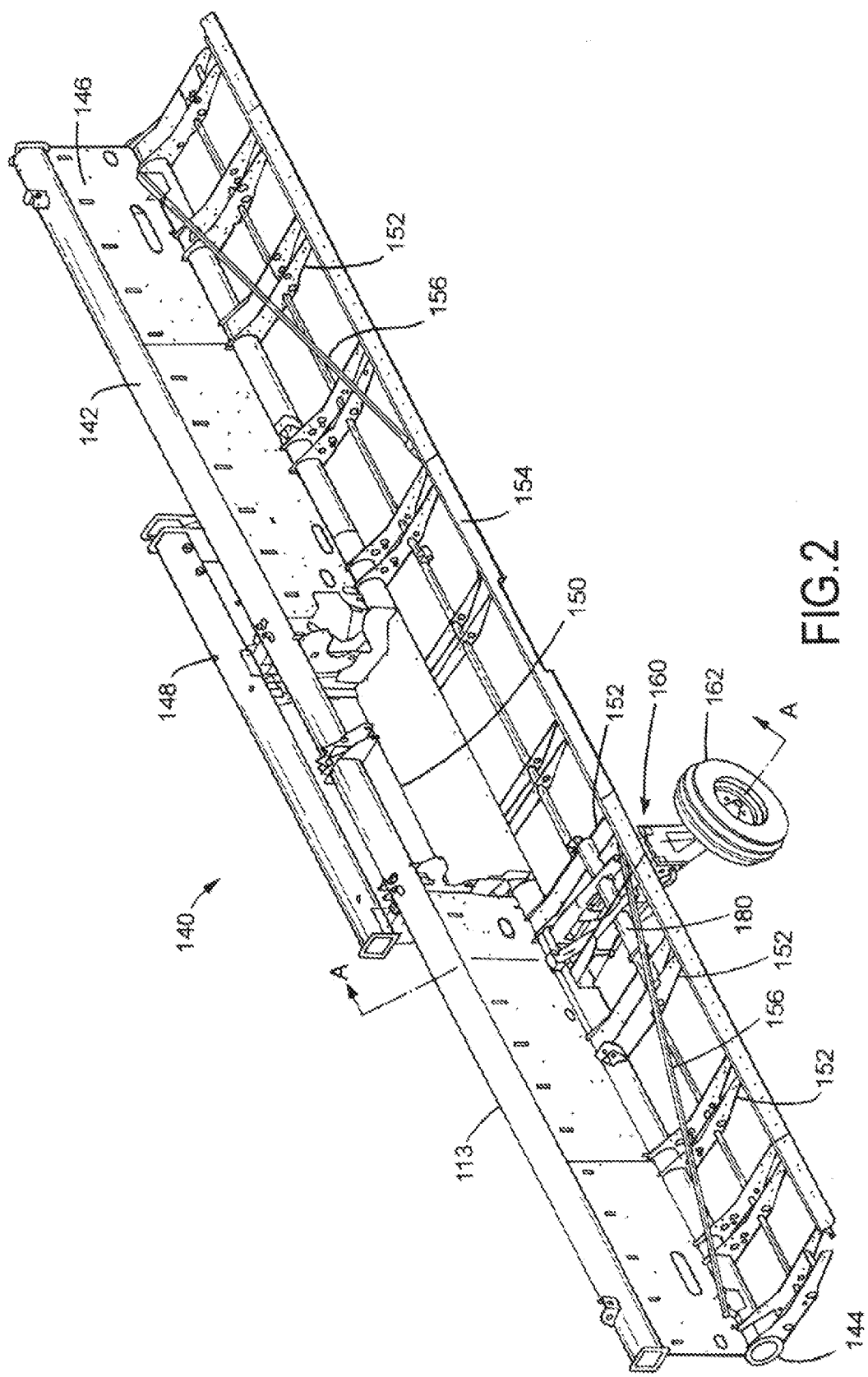
FIG. 2 is a front perspective view of an agricultural harvester header frame including a wheel assembly according to an aspect of the subject application.

Referring to FIG. 2, there is generally shown a transport assembly 140 for a header of an agricultural harvester according to an aspect of the subject application. The transport assembly, which is depicted in a transportation mode, includes a header frame 113 having upper and lower hollow beams 142, 144 which are joined by a rear wall 146. An attachment frame 148 is affixed to the rear wall and is configured to detachably connect the frame 113 to a combine in the known manner. An opening 150 is situated generally in the center of wall 146 and is alignable with the mouth of a combine feederhouse such as feederhouse 16 (FIG. 1). A plurality of rigid profile members 152 are affixed to and extend forwardly from the lower beam 144. A cutterbar support beam 154 is affixed to the fore ends of the profile members and is configured to carry a cutterbar such as cutterbar 20 (FIG. 1). Frame 113 can also include one or more rods 156 extending diagonally from the rear wall 142 to the cutterbar support beam 154 in order to counteract flexure of the frame 113 during operation of the header.

Figure 3:
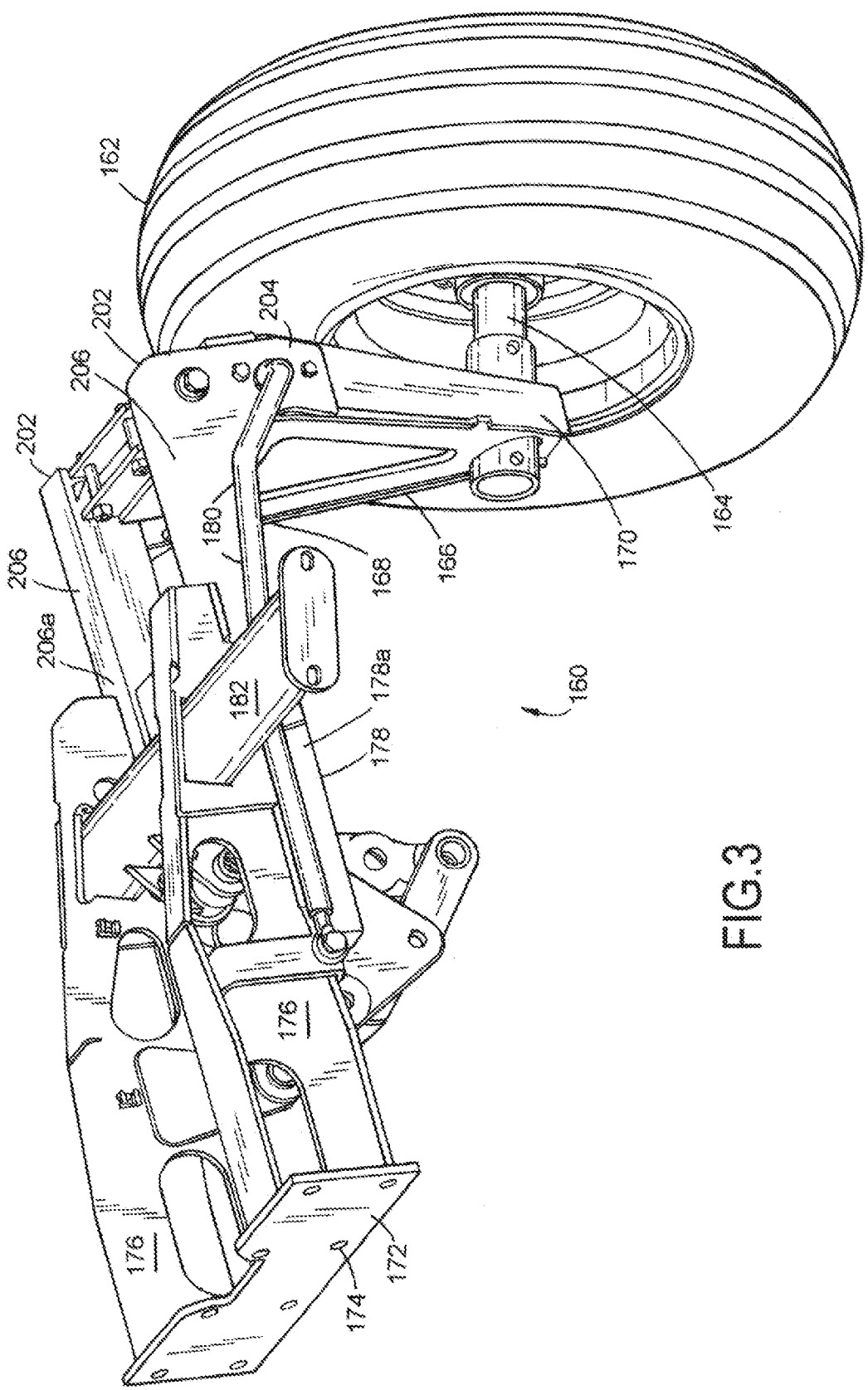
FIG. 3 is a rear perspective view of a wheel assembly according to an aspect of the subject application.

Still referring to FIG. 2, there is shown a wheel assembly 160 according an aspect of the subject application. The wheel assembly, which is described in greater detail below, is mounted to the header frame or chassis 113 between a pair of profile members 152 and includes a wheel 162 upon which the transport assembly 140 is supported when being transported from one location to another. As will be described hereinafter and as generally shown in FIG. 3, in addition to the header frame 113, the transport assembly 140 includes at least an axle support member 166 and a first swing arm 178 having a first end pivotably connected to the header frame and a second end opposite the first end pivotably connected to the axle support member. So constructed and arranged, the axle support member pivots relative to the first swing arm between a first position and a second position. The first position can be a header transportation position and the second position can be a header harvesting position, or vice versa.

Referring to FIG. 3, the wheel assembly 160 is shown on an enlarged scale. As seen in FIG. 3, the wheel 162 is rotatably supported on a wheel axle 164 which, in turn, is supported by an axle support member 166. The axle support member has a first or proximal end 168 and a second end 170 distal to the first end which carries axle 164.

The wheel assembly additionally includes a mounting plate 172 for facilitating attachment of the wheel assembly to the header frame 113 (FIG. 2). Plate 172 may be permanently attached to the header frame such as by welding or the like. In the alternative, plate 172 may be provided with a plurality of apertures 174 through which unillustrated fasteners such as bolts or the like may pass in order to releasably attach the wheel assembly to the header frame.

Affixed to and extending forwardly of the mounting plate 172 is a pair of frame members 176 which pivotably support first and second swing arms or linkages 178, 180 in the manner described below. According to an aspect, wheel assembly further includes a cross beam 182 extending through the frame members 176. Opposite ends of the cross beam are attachable to an adjacent pair of header frame profile members 152 (FIG. 2) in order to distribute the load experienced by the wheel 162 to the profile members as well as the mounting plate 172 during transport of the header.

Figure 4:
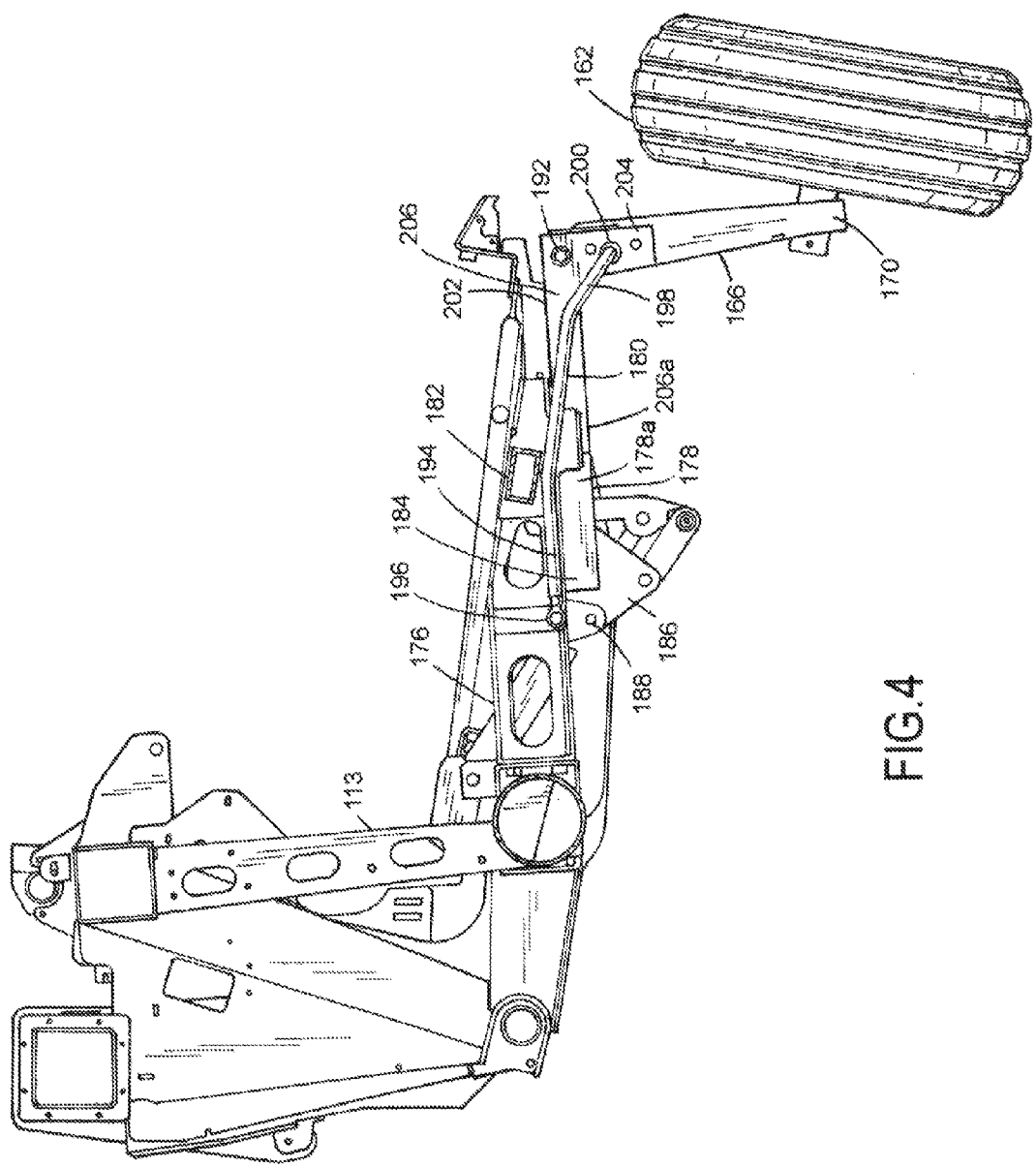
FIG. 4 is a side view of a header frame and wheel assembly according to an aspect of the subject application with the wheel thereof shown in a transportation mode.
Figure 5:
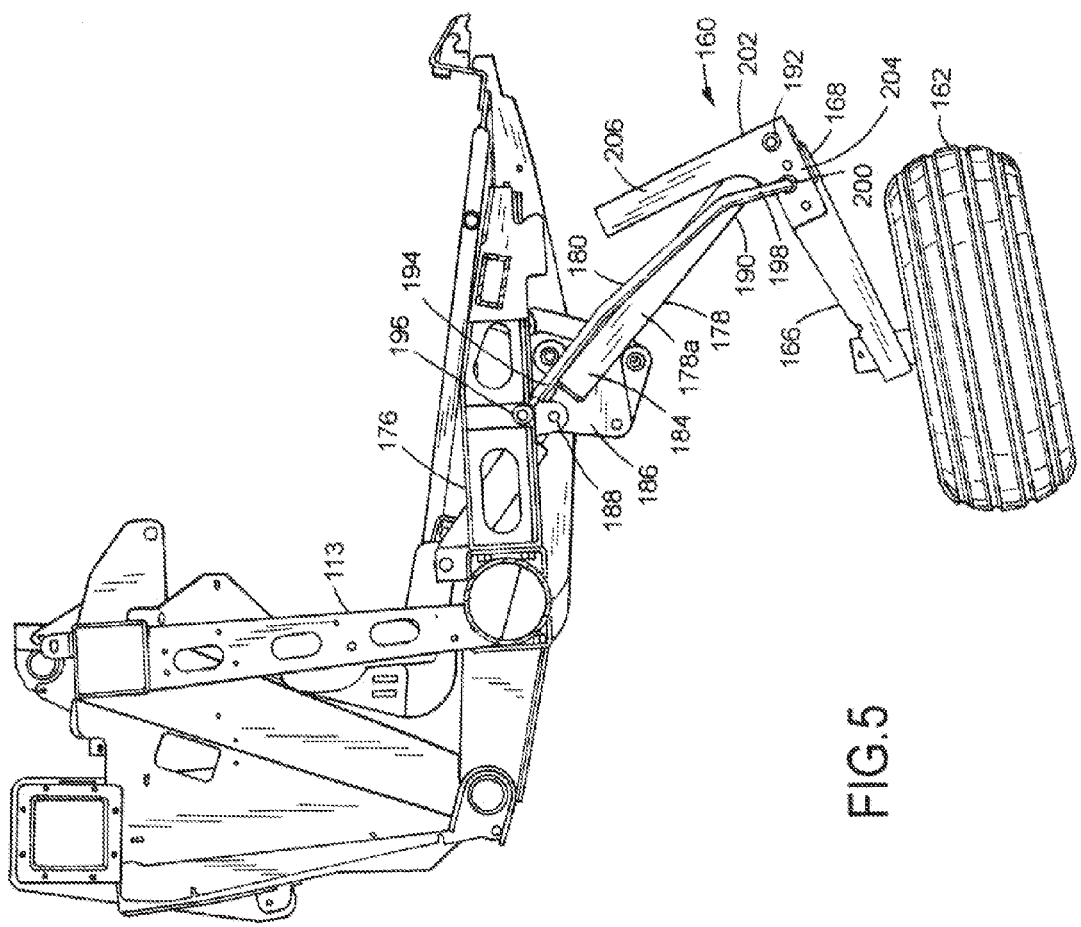
FIG. 5 is a side view of the header frame and wheel assembly of FIG. 4 with the wheel thereof shown in a position intermediate a transportation mode and a harvesting mode.

Referring to FIGS. 4 and 5, the first swing arm or linkage 178 comprises a pair of channel members 178a, one of which is shown in FIGS. 4 and 5, that are pivotably connected to the header frame 113 by virtue of pivoted connections to the frame members 176. More specifically, as shown in FIG. 4, each of channel members 178a of the first swing arm or linkage 178 has a first end 184 that is affixed to a plate 186 that in turn is pivotably connected to frame member 176 at pivot 188. As seen in FIG. 5, each channel member 178a of the first swing arm or linkage 178 has a second end 190 that is pivotably connected at pivot 192 proximate to the first or proximal end 168 of the axle support member 166.

FIGS. 4 and 5 additionally show the structural connections of the second swing arm or linkage 180. The second swing arm or linkage is pivotably connected to the header frame 113 by virtue of a pivoted connection to frame member 176. More particularly, the second swing arm or linkage has a first end 194 pivotably connected at pivot 196 to frame member 176 and a second end 198 opposite the first end pivotably connected at pivot 200 to the axle support member 166 at a point spaced from the second end of the first swing arm or linkage 178. In particular, the pivot 200 is spaced from pivot 192 and situated closer to the axle 164 than pivot 192. As seen in FIGS. 4 and 5, and for reasons described hereinafter, the second swing arm or linkage 180 has an overall longitudinal length greater than an overall longitudinal length of the first swing arm or linkage 178 and has its first end pivotably connected to the header frame above the first end of the first swing arm or linkage.

Referring back to FIG. 3, the wheel assembly 160 further includes a pair of brackets 202 connected to one of the first swing arm or linkage 178 and the wheel axle support member 166 to limit pivotable movement of the wheel axle support member relative to the first swing arm or linkage. In FIGS. 4 and 5, it will be seen that each bracket 202 is configured substantially as an L-bracket having legs 204 and 206. Leg 204 is rigidly connected to the wheel axle support member 166 such as by bolting, welding or the like, and leg 206 is operable to pivot or swing with respect to the first swing arm or linkage 178 about pivot 192. As most clearly seen in FIGS. 3 and 4, during transport of the header 112 proximal ends 206a of legs 206 rest atop the channel members 178a and beneath distal ends of the frame members 176.

So positioned, the legs 206 are pinched or clamped between the channel members 178a and the frame members 176. As a consequence, potentially harmful weight loading on the second swing arm or linkage 180, including the weight of the wheel 162, the axle 164, the wheel axle support member 166 and the first swing arm or linkage 178, is effectively eliminated during header transport.

Collectively, therefore, FIGS. 3-5 show the wheel assembly which includes the wheel axle support member 166, the first swing arm 178 and the second swing arm 180 having the proximal end 168 and the distal end 170 connected to the wheel 162. The assembly further includes the first swing arm or linkage 178 having the first end 184 for pivotably connecting to the chassis 113 and the second end 190 opposite the first end pivotably connected to the wheel axle support member. In addition, the assembly includes the second swing arm or linkage 180 having the first end 194 for pivotably connecting to the chassis 113 and the second end 198 opposite the first end pivotably connected to the wheel axle support member, wherein the wheel axle support member pivots relative to the first and second swing arms or linkages between the first position and the second position.

Figure 7:
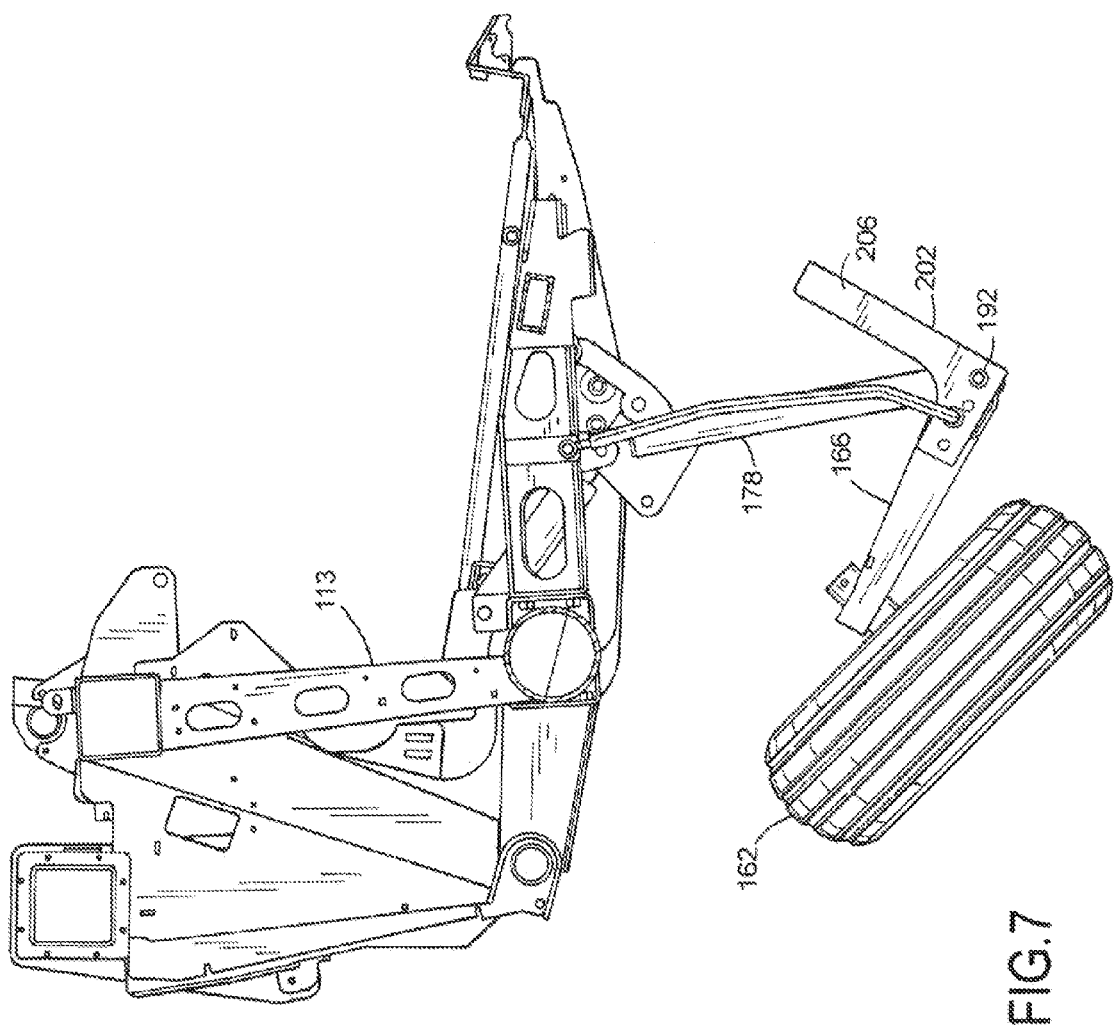
FIG. 7 is a side view of the header frame and wheel assembly of FIG. 4 with the wheel thereof shown in a further position intermediate a transportation mode and a harvesting mode.
Figure 8:
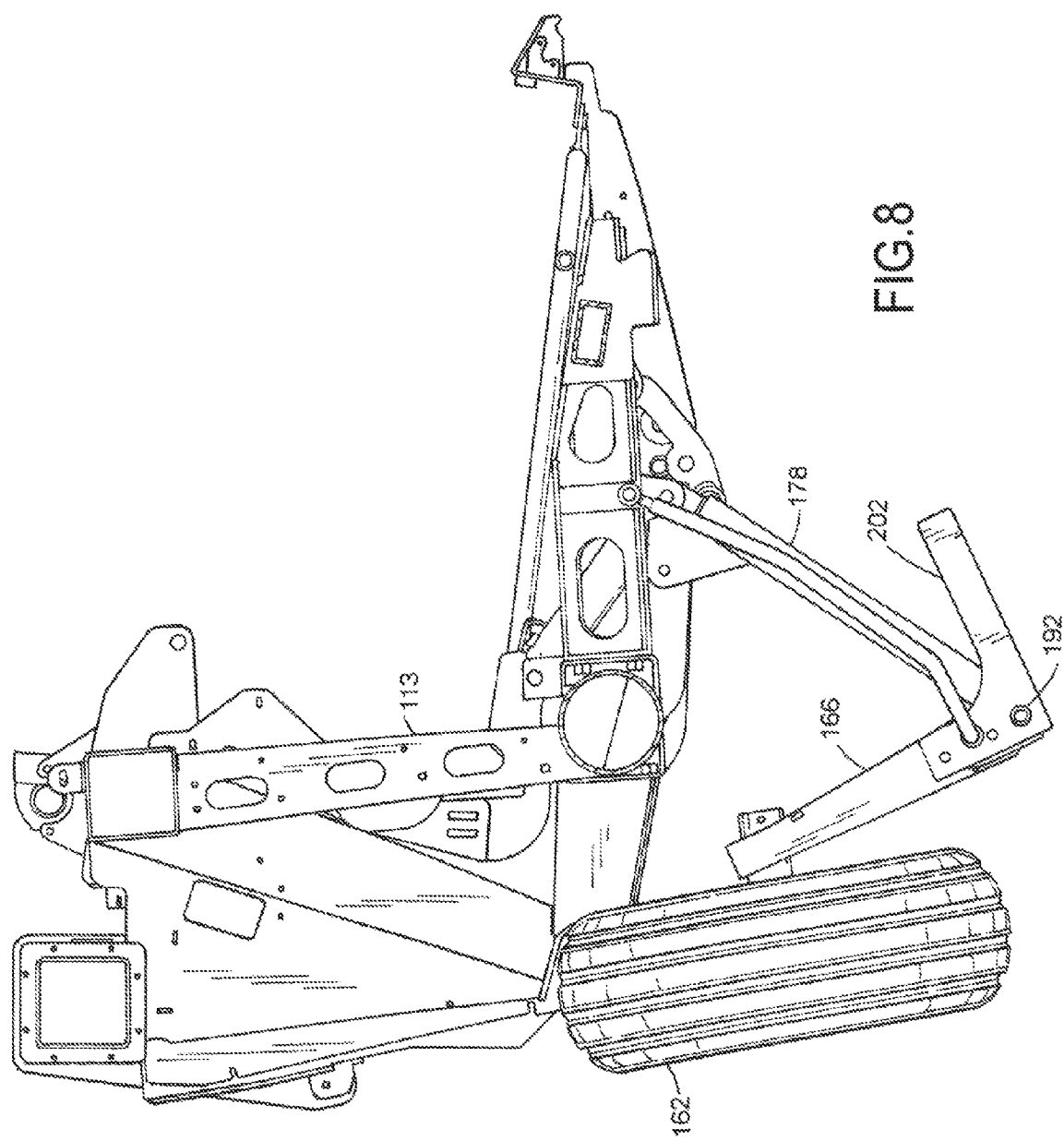
FIG. 8 is a side view of the header frame and wheel assembly of FIG. 4 with the wheel thereof shown in a further position intermediate a transportation mode and a harvesting mode.
Figure 9:
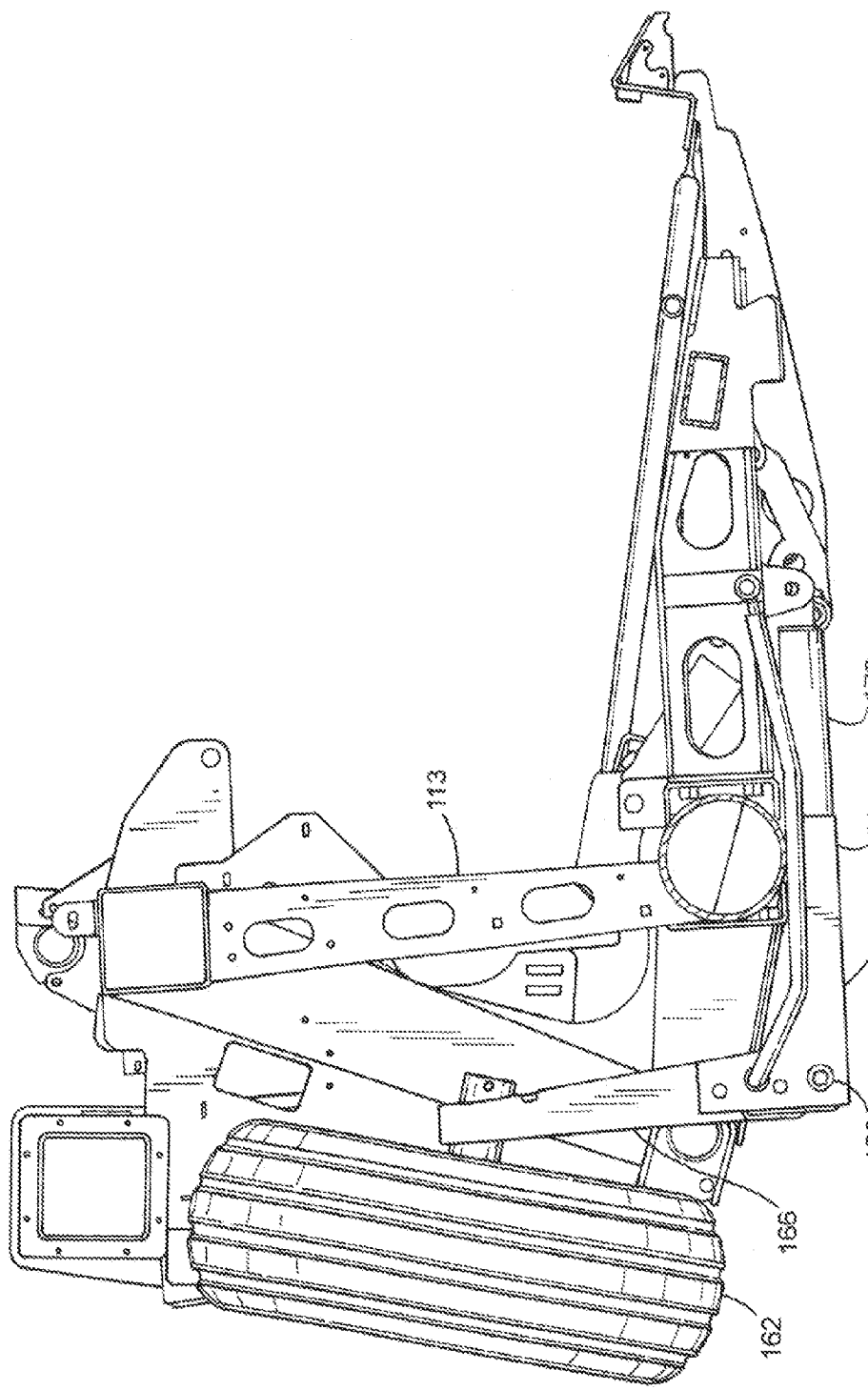
FIG. 9 is a side view of the header frame and wheel assembly of FIG. 4 with the wheel thereof shown in a harvesting mode.

Referring to FIGS. 4-9 there is shown the interrelationship between the first and second swing arms or linkages 178, 180 and the path of movement of wheel 162 as the wheel is moved from a header transportation or road position (FIG. 4) to a field or harvesting position (FIG. 9). As the wheel moves from the position shown in FIG. 4 to that shown in FIG. 9, it travels along a vertical plane through an arc of varying radius, as further described below.

Referring initially to FIGS. 4 and 5, in FIG. 4 the wheel 162 is depicted as it would appear when the header is being transported on a road, whereas in FIG. 5 the wheel is shown as it would appear after it has begun to swing downwardly under the influence of a later-described actuator. In particular, comparison of FIGS. 4 and 5 reveals that when viewed as shown in FIG. 5 the first swing arm or linkage 178 has swung through an arc angle of approximately 45° in the clockwise direction while the wheel 162 has swung through an arc angle of about 75° in the clockwise direction. The reasons that the wheel 162 swings through an angle greater than that of the first swing arm or linkage 178 are two-fold. First, as discussed above, the wheel is carried by the wheel axle support member 166 which, in turn, is pivotably connected at pivot 192 to the first swing arm or linkage 178. Second, as the wheel 162 begins to traverse the path from the transportation position to the field position, the second swing arm or linkage 180 begins to pull on the wheel axle support member 166 thereby pulling the wheel toward the bottom of the header frame 113. That is, owing to the fixed distance the wheel axle support member 166 is connected to the first member 176 via the second swing arm, the pivot of the wheel axle support member must follow an arc path dictated by the second swing arm. This second aspect is reflected by the separation of L-bracket leg 206 from channel member 178a as depicted in FIG. 5.

Figure 6:
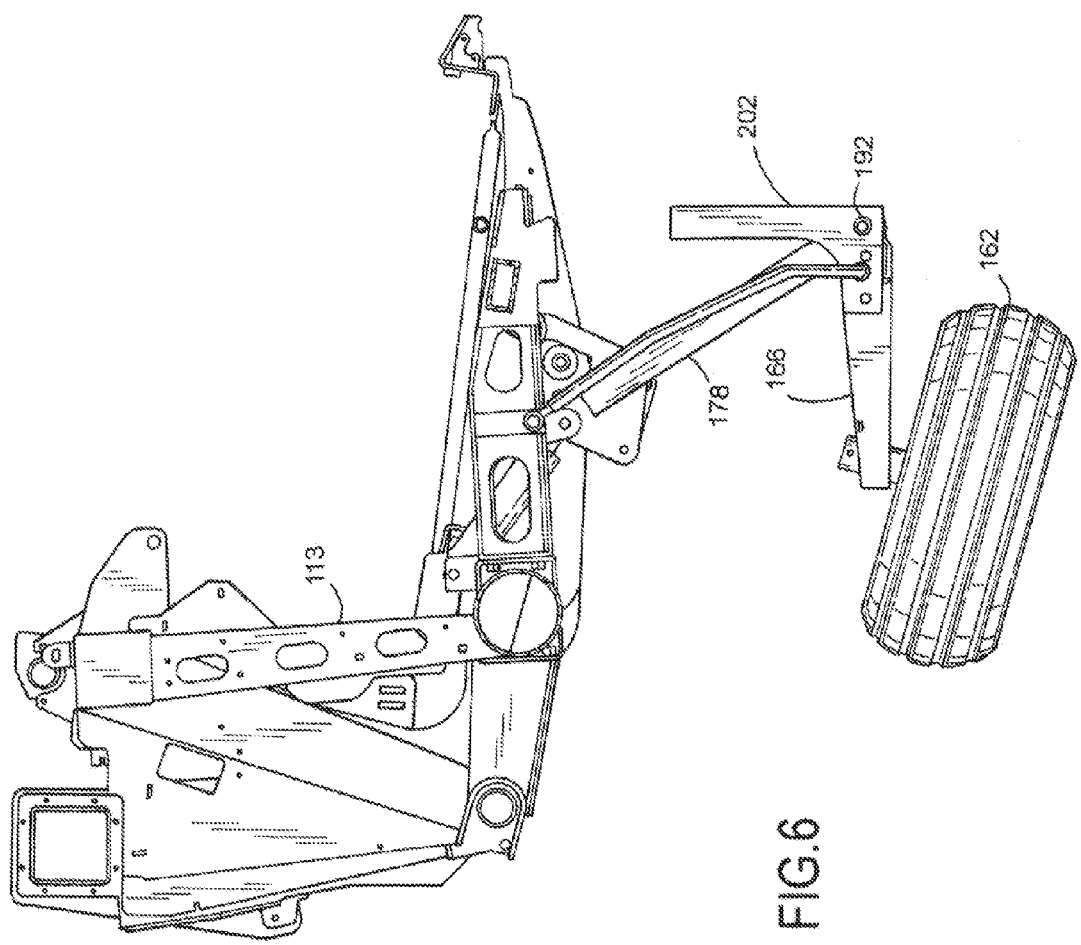
FIG. 6 is a side view of the header frame and wheel assembly of FIG. 4 with the wheel thereof shown in a further position intermediate a transportation mode and a harvesting mode.

FIG. 6 shows a further stage in the path of motion of the wheel 162. As seen in FIG. 6, the first swing arm or linkage 178 has traversed an arc angle of approximately 75° from the transport position shown in FIG. 4. Simultaneously, the wheel 162 has swung through an arc angle of approximately 90° versus the FIG. 4 transportation position. During this portion of the path of motion of wheel 162, the second swing arm or linkage 180 continues to pull upwardly on the wheel axle support member 166, thereby pulling the wheel 162 toward the bottom of the header frame 113 as compared to a constant radius arc path of the swing arms and fixed wheel axle support members of conventional wheel assemblies.

FIG. 7 depicts a further stage in the path of motion of the wheel 162. As seen in FIG. 7, the first swing arm or linkage 178 has traversed an arc angle of approximately 90° from the transport position shown in FIG. 4. Simultaneously, the wheel 162 has swung through an arc angle of approximately 125° versus the FIG. 4 transportation position. At this stage, the second swing arm or linkage 180 essentially ceases to pull on the wheel axle support member 166. That is, when the first swing arm or linkage 178 has traversed an arc angle of approximately 90° from the transport position shown in FIG. 4, the second swing arm or linkage 180 has pulled the wheel axle support member 166 as far inwardly as the length of the second swing arm or linkage will permit. It is at this position that the gap between the free legs 206 of the L-brackets 202 are at the greatest distance from the first swing arm or linkage 178.

FIG. 8 shows a further stage in the path of motion of the wheel 162. As seen in FIG. 8, the first swing arm or linkage 178 has traversed an arc angle of approximately 125° from the transport position shown in FIG. 4. Simultaneously, the wheel 162 has swung through an arc angle of approximately 150° versus the FIG. 4 transportation position. During this portion of the path of motion of wheel 162, the second swing arm or linkage 180 has begun to push on the wheel axle support member 166 thereby pushing the wheel away from the bottom of the header frame 113.

FIG. 9 shows the wheel 162 as it would appear when the header is in harvesting mode. In this position, both the wheel and the first swing arm or linkage 178 have traversed arc angles of approximately 180° from their transportation positions shown in FIG. 4. As seen in FIG. 9, the second swing arm or linkage 180 has pushed the wheel axle support member 166 to its fullest extent wherein the gaps between the free legs 206 of the brackets 202 and the first swing arm or linkage 178 have closed, e.g., the free legs of the brackets have come to rest against the first swing arm or linkage.

FIGS. 10-13 are side elevational cross-section views of the header frame and wheel assembly of the subject application taken along line A-A of FIG. 2 and correspond substantially to the stages in the path of motion of the wheel 162 depicted in FIGS. 4, 5, 8 and 9, respectively.

Figure 10:
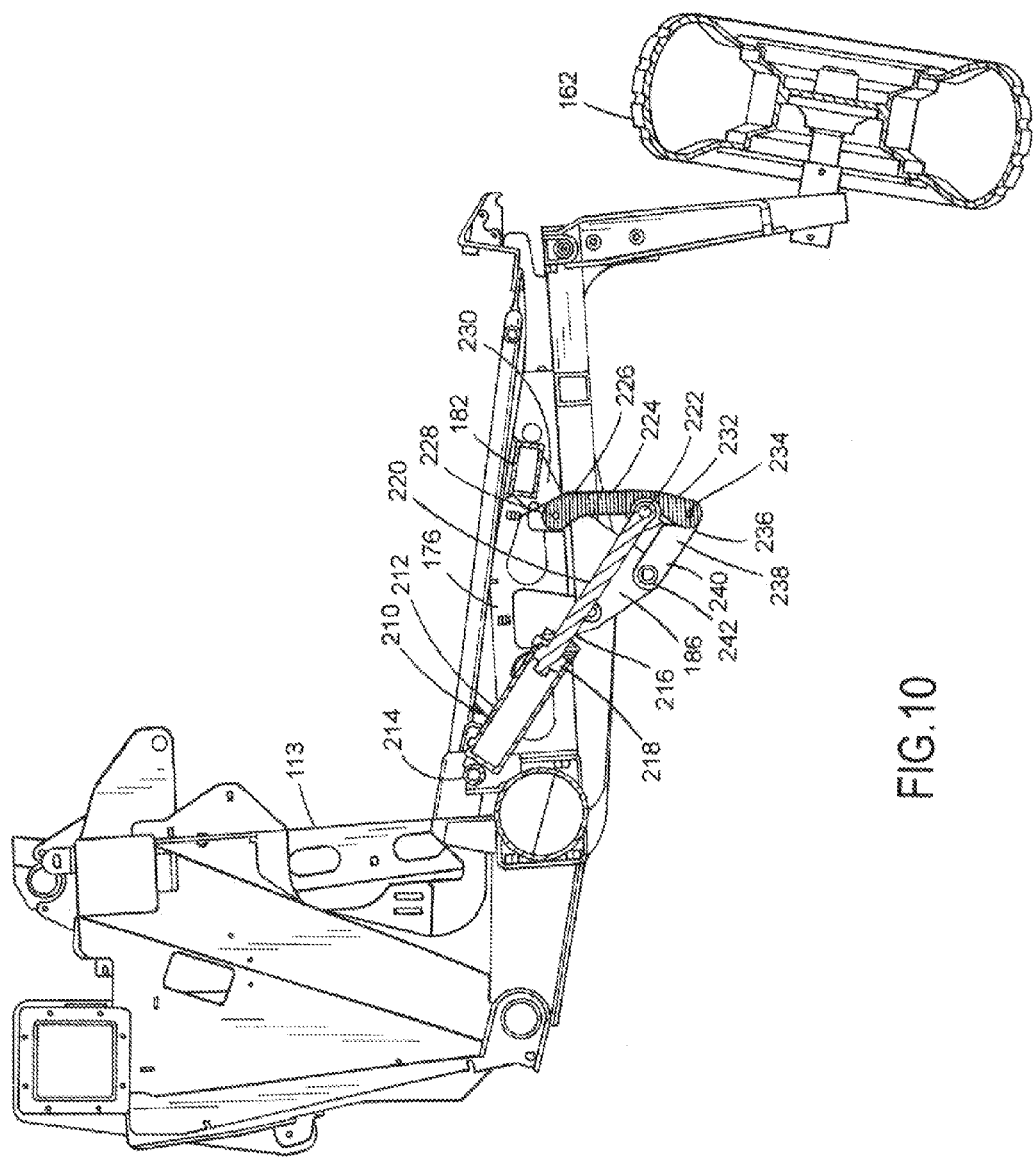
FIG. 10 is a side cross-section view of a header frame and wheel assembly according to an aspect of the subject application taken along line A-A of FIG. 2 with the wheel thereof shown in a transportation mode.

Referring to FIG. 10, wheel 162 is shown as it would appear when the header is being transported on a road, e.g. transportation mode. It is at this disposition of wheel 162 that a wheel assembly positioning actuator 210 is at its fully extended position. Actuator 210 can be any suitable extendable and retractable device such as a hydraulic cylinder, a pneumatic cylinder or a screw jack that derives its power from a hydraulic, pneumatic or electronic system provided on the combine or the header. As described below, the actuator 210 is operatively connected to the first swing arm or linkage 178 to move the first swing arm or linkage between an extended position wherein the wheel 162 is in a transportation position and a retracted position wherein the wheel is in a harvesting position.

As illustrated in FIG. 10, actuator 210 is constructed as a two-way hydraulic cylinder. A cylinder portion 212 of the actuator is pivotably connected to header frame 113 at pivot 214. A piston portion 216 of the actuator 210 includes a piston 218 and a shaft or rod 220. Piston 218 is slidably received in the cylinder portion 212 and rod 220 has a first or proximal end integrally connected to and extending from the piston and a second or distal end pivotably connected at pivot 222 to a cylinder link 224. As illustrated, the cylinder link has a first end 226 pivotably connected at pivot 228 to gusset plates 230 (one of which is shown in FIG. 10) that are connected to the cross beam 182. Alternatively, the first end of the cylinder link can be pivotably mounted directly to the frame members 176. Cylinder link 224 also has a second end 232 pivotably connected at pivot 234 to first ends 236 of a pair of connecting links 238 (one of which is shown in FIG. 10). The connecting links 238 have second ends 240 that are pivotably connected at pivot 242 to plates 186.

As described above in connection with FIG. 4, plates 186 are fixedly connected to the first ends 184 of channel members 178a of the first swing arm or linkage 178. In addition, the plates 186 are pivotably connected to frame members 176 at pivots 188. Accordingly, movement of the cylinder link 224 by operation of actuator 210 transfers motive force from the cylinder link to the pair of connecting links 238 which, in turn, transfer motive force to the plates 186. In so doing, movement of the actuator 210 causes downward and upward pivoting of the first swing arm or linkage 178 relative to the frame members 176. Simultaneously, the axle support member 166 pivots relative to the first swing arm or linkage 178 by virtue of the pivoted connections of the second swing arm or linkage 180 with the frame members 176 and the axle support member, respectively.

Figure 11:
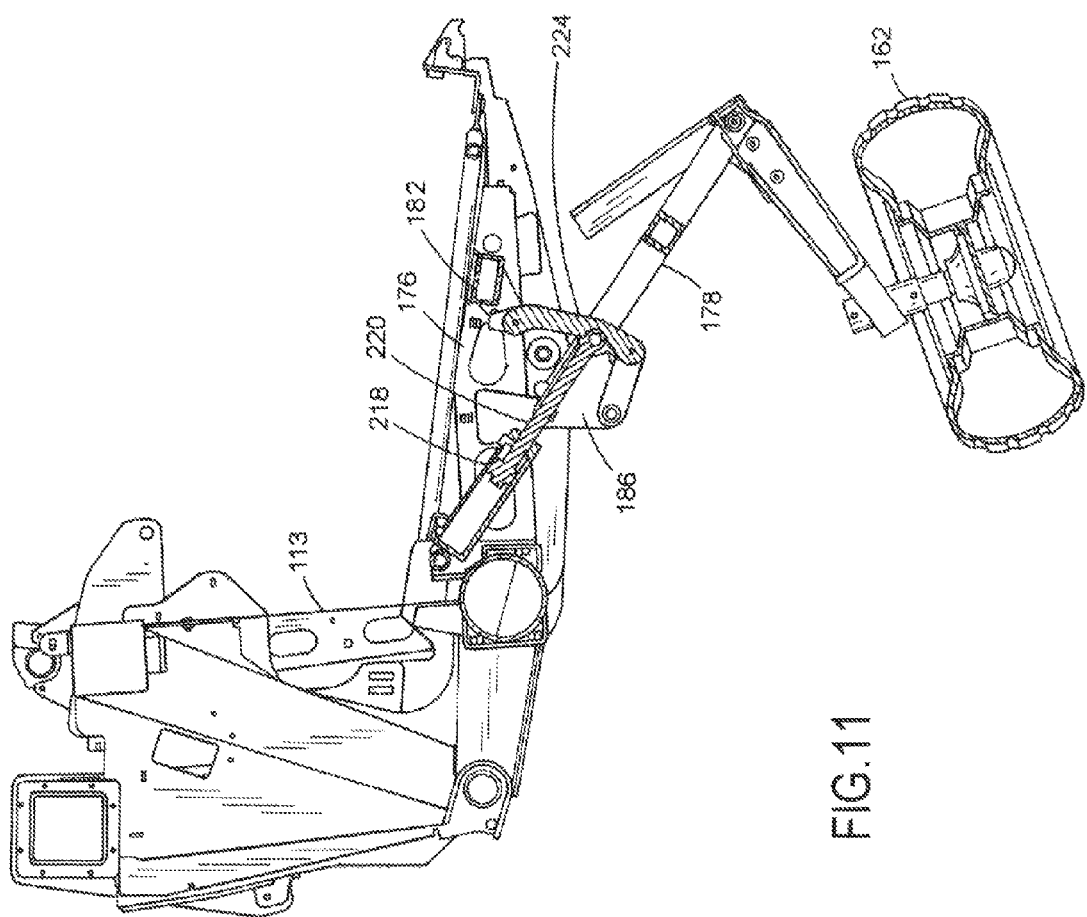
FIG. 11 is a side cross-section view of the header frame and wheel assembly of FIG. 10 with the wheel thereof shown in a position intermediate a transportation mode and a harvesting mode.
Figure 12:
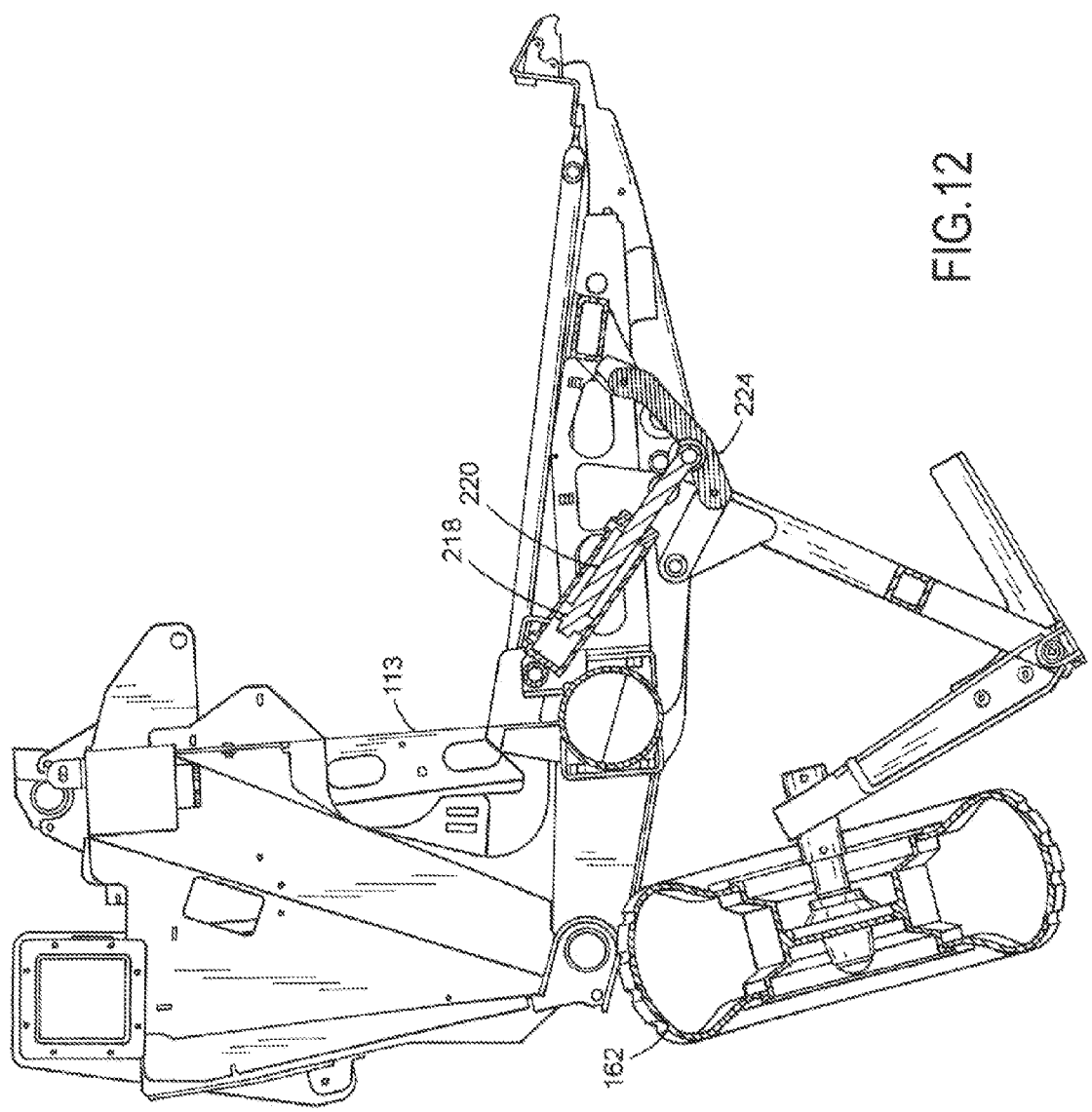
FIG. 12 is a side cross-section view of the header frame and wheel assembly of FIG. 10 with the wheel thereof shown in a further position intermediate a transportation mode and a harvesting mode.
Figure 13:
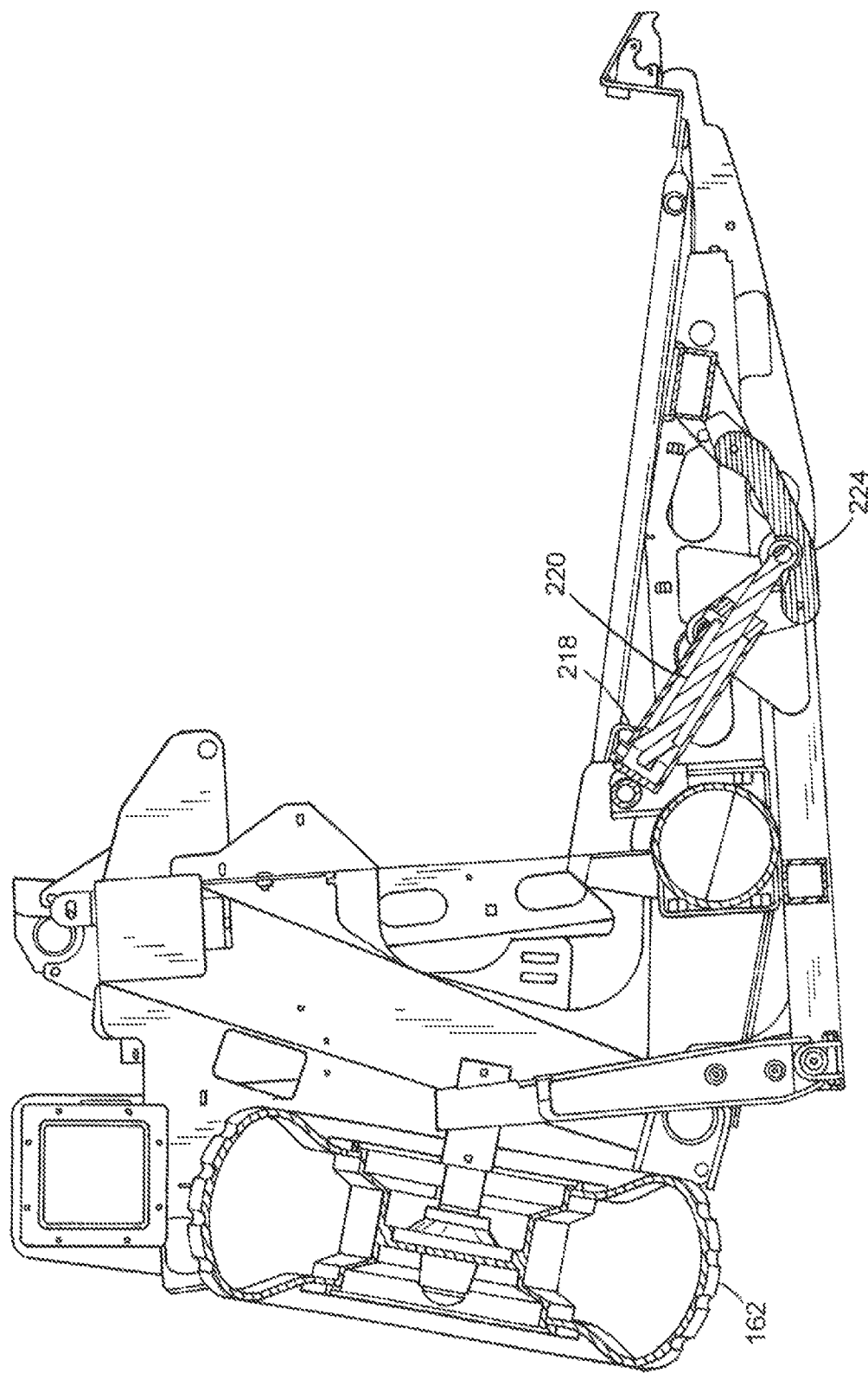
FIG. 13 is a side cross-section view of the header frame and wheel assembly of FIG. 10 with the wheel thereof shown in a harvesting mode.

Referring to FIG. 11, wheel 162 is shown as it would appear after it has begun to swing downwardly. In this position, piston 218 and rod 220 have begun to retract thereby pulling on the cylinder link 224 and causing the first swing arm or linkage 178 and plates 186 to pivot downwardly with respect to the frame members 176. FIG. 12 shows the piston 218, rod 220 and cylinder link 224 further retracted and the wheel 162 in a position approaching the field or harvesting position. In FIG. 13 the piston 218, rod 220 and cylinder link 224 are fully retracted and the wheel 162 is in the harvesting position.

Figure 14:
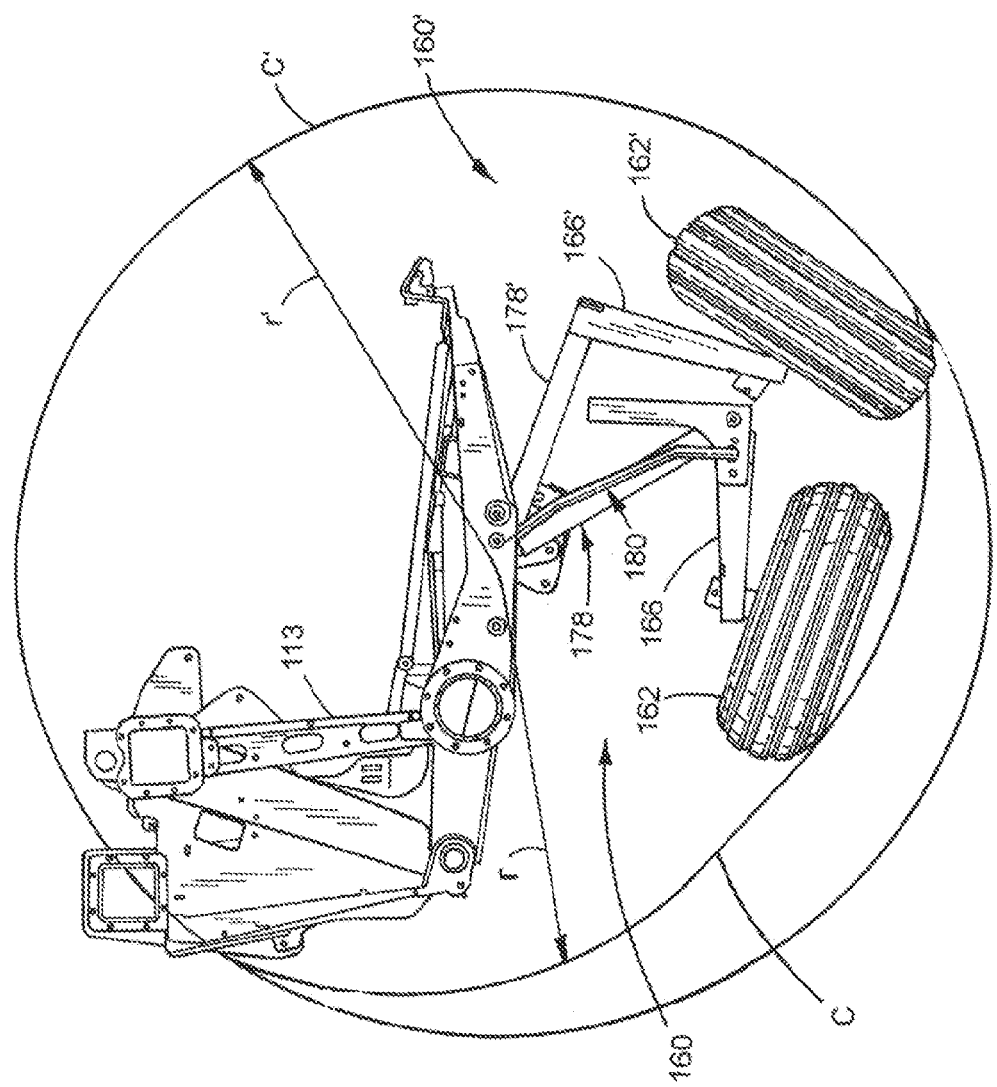
FIG. 14 is a composite side view of a header frame, a wheel assembly according to the subject application and a conventional wheel assembly showing the paths of movement of a wheel according to the subject application and the wheel according to the conventional design between transportation and harvesting positions.

Turning to FIG. 14 there is shown a composite image of a harvester header frame or chassis 113 hypothetically equipped with a header transport wheel assembly according to the subject application 160 and a conventional header transport wheel assembly 160'. In addition, FIG. 14 shows the paths traversed by the wheels 162, 162' of the header transport wheel assembly according to the subject application and the conventional header transport wheel assembly between transportation and harvesting positions, and vice versa. As described above, the axle support member 166 according to the subject application is pivotably connected to the first and second swing arms or linkages 178, 180. In contrast, the axle support member 166' according to the conventional design is fixedly connected to a single swing arm or linkage 178'. As a result, and as seen in FIG. 14, the fixed connection between the single swing arm linkage 178' and the axle support member 166' results in the wheel 162' defining a constant radius r' with respect to its connection with the header frame or chassis 113. That is, the wheel 162' thus traverses a portion of a circle C' of constant radius r' as the wheel 162' moves from the transportation position to the harvesting position, and vice versa. Consequently, the wheel 162' swings lower than would otherwise be desirable beneath the header frame 113 when moving between the transportation and harvesting positions such that the wheel 162' contacts the ground and causes harm to the wheel assembly 160' during swinging.

In contrast, the pivoted connection between the wheel axle support member 166 and the two point pivot linkage assembly 178, 180 of the subject application results in the wheel 162 traversing an arc C defined by a radius r that varies through out movement of the wheel from its transportation position to its harvesting position and vice versa. Beginning at the transportation position, e.g., that shown in FIG. 2, the wheel 162 would be disposed in substantially the same position as would the wheel 162' of the conventional design. In such position, the radii r' and r would be substantially equal because of the fixed distance of the wheel 162 from the frame 113 as a result of the two point pivot linkage assembly 178, 180. However, as the wheel 162 moves between the transportation and harvesting positions, the axle support member 166 pivots the wheel 162 inwardly relative to circle C' whereby the wheel moves through an arc of varying but lesser radius than radius r'. Alternatively expressed, the wheel 162 travels between its transportation and harvesting position partially in a chord-like fashion through circle C' along chord C. Constructed as such, greater ground clearance is provided by the wheel assembly 160 versus wheel assembly 160' thereby reducing the likelihood that the wheel 162 contacts the ground as it swings beneath the header frame 113.

The subject application thus provides a transport assembly for a header of an agricultural harvester including a header frame or chassis 113, an axle support member 166 supporting a wheel axle 164, the wheel axle rotatably carrying a wheel 162. The two point pivot linkage assembly including the first and second swing arms or linkages 178, 180 links the axle support member to the header frame and the two point pivot linkage assembly has first ends pivotably connected to the header frame and second ends opposite the first ends pivotably connected to the axle support member. Constructed and arranged as such, the axle support member pivots relative to the two point pivot linkage assembly between a transportation position and a harvesting position.

In addition to the above-described apparatus, the subject application provides a method of moving a transportation wheel of a header of a combine harvester between a transportation position and a harvesting position which reduces the likelihood of contact by the transportation wheel with the ground as the wheel swings between the transportation and harvesting positions, and vice versa. The method involves the acts of linking the wheel to a frame or chassis of the header with a two point pivot linkage assembly, wherein the wheel is moveable relative to the frame between the transportation position and the harvesting position. In the transportation position the wheel defines a circle with a radius defined by a fixed distance of the wheel from the frame as a result of the two point pivot linkage assembly. However, as a result of the two-point linkage assembly disclosed herein the radius between the wheel and the header frame varies as the wheel moves from the transportation position to the harvesting position. That is, as the wheel moves from the transportation position to the harvesting position it moves in a chord-like fashion partially through the circle defined by the harvesting position of the wheel. The result is an assembly that provides increased ground clearance at the bottom of the arc as the wheel swings beneath the header frame, thereby lessening the possibility that the wheel assembly will suffer damage as the wheel is moved between its transportation and harvesting positions.

It will be appreciated by those skilled in the art that changes could be made to the various aspects described above without departing from the broad inventive concept thereof. It is to be understood, therefore, that the subject application is not limited to the particular aspects disclosed, but it is intended to cover modifications within the spirit and scope of the subject application as defined by the appended claims.

We claim:

1. A transport assembly for a header of an agricultural harvester comprising:
   a header frame;
   an axle support member supporting a wheel axle, the wheel axle rotatably carrying a transport wheel, wherein the axle support member has a first end and a second end distal to the first end; and
   a first swing arm having a first end pivotably connected to the header frame and a second end opposite the first end pivotably connected to the axle support member,
   comprising a second swing arm having a first end pivotably connected to the header frame and a second end opposite the first end pivotably connected to the axle support member, wherein the second swing arm has an overall longitudinal length greater than an overall longitudinal length of the first swing arm, wherein the first end of the second swing arm is pivotably connected to the header frame above the first end of the first swing arm, and wherein the second end of the first swing arm is connected to the axle support member proximate the axle support member first end and the second end of the second swing arm is connected to the axle support member at a point spaced from the second end of the first swing arm
   wherein the axle support member pivots relative to the first and second swing arms between a harvesting position and a transportation position, and wherein the transport wheel swings under the header frame through a vertical plane as it moves between harvesting and transportation positions.

2. The transport assembly of claim 1, further comprising an actuator operatively connected to the first swing arm to move the first swing arm between an extended position and a retracted position.

3. The transport assembly of claim 1, further comprising a bracket connected to one of the first swing arm and the axle support member to limit pivotable movement of the axle support member relative to the first swing arm.

4. The transport assembly of claim 1, wherein the wheel moves in a chord-like fashion partially through a circle as the wheel is moved from the transportation position to the harvesting position.

5. The transport assembly of claim 1, wherein the wheel moves through an arc of varying radius between the transportation and harvesting positions.

6. The transport assembly of claim 1, further comprising a bracket connected to the two point pivot linkage assembly and the wheel axle support member to limit pivotable movement of the wheel axle support member relative to the two point pivot linkage assembly.

7. The transport assembly of claim 1, wherein the bracket is an L-bracket having a leg rigidly connected to the wheel axle support member.

\* \* \* \* \*